US 6,650,551 B1

(12) United States Patent
Melgarejo

(10) Patent No.: US 6,650,551 B1
(45) Date of Patent: Nov. 18, 2003

(54) ZVS/ZVT RESONANT CHOKE WITH VOLTAGE CLAMP WINDING

(75) Inventor: Manolo Mariano M. Melgarejo, Quezon (PH)

(73) Assignee: Astec International Limited (HK)

( * ) Notice: Subject to any disclaimer, the term of this patent is extended or adjusted under 35 U.S.C. 154(b) by 0 days.

(21) Appl. No.: 10/163,682

(22) Filed: Jun. 6, 2002

(51) Int. Cl.[7] .......................... H02M 3/335; H02M 7/68
(52) U.S. Cl. ........................... 363/16; 363/17; 363/98
(58) Field of Search ........................... 363/16, 17, 98, 363/132

(56) References Cited

U.S. PATENT DOCUMENTS

| 5,198,969 | A | | 3/1993 | Redl et al. .................... 363/17 |
|---|---|---|---|---|
| 5,267,133 | A | * | 11/1993 | Motomura et al. .......... 323/222 |
| 5,914,572 | A | * | 6/1999 | Qian et al. ............... 315/209 R |
| 6,272,023 | B1 | * | 8/2001 | Wittenbreder ................. 363/16 |
| 6,441,673 | B1 | * | 8/2002 | Zhang ......................... 327/110 |

* cited by examiner

Primary Examiner—Bao Q. Vu
(74) Attorney, Agent, or Firm—Harness, Dickey & Pierce, P.L.C.

(57) ABSTRACT

A zero voltage switching (ZVS) or zero voltage transition (ZVT) bridge converter for driving a rectifier circuit. A clamp winding or inductor is placed in parallel with a resonant choke of the bridge converter. The clamp winding clamps the voltage at the resonant choke. Clamping the resonant choke in turn limits the voltage at the secondary winding of an output transformer. The output transformer is connected to the rectifier circuit. By limiting the voltage at the output transformer, the voltage at the rectifier circuit is limited as well.

16 Claims, 4 Drawing Sheets

ZVS/ZVT RESONANT CHOKE WITH VOLTAGE CLAMP WINDING

FIELD OF THE INVENTION

The present invention relates generally to soft-switching DC/DC converters and, more particularly, to an apparatus for clamping the voltage across a resonant choke to clamp or limit the voltage across the output rectifier devices in a soft-switching DC/DC converter.

BACKGROUND OF THE INVENTION

Phase shifted, DC/DC bridge converters having zero voltage transition (ZVT) or zero voltage switching (ZVS) are commonly utilized to minimize switching losses. While the typical bridge converter system can be quite satisfactory for many applications, one problem that such bridge converters present is that excess voltage overshoot and severe ringing can occur at the output rectifiers. The output rectifiers are typically embodied as rectifier diodes, but may also be synchronous rectifiers made up of MOSFETs. The excessive overshoot and ringing is caused by the interaction of the reverse recovery process of the rectifier with the leakage inductance of the transformer and can degrade and subsequently cause failure of the output rectifier devices. A snubber circuit does not typically suitably address the excessive overshoot and ringing. Typically clamping of the switches is required.

One proposed solution to this situation can be found with respect to U.S. Pat. No. 5,198,969 to Redl. Redl inserts a pair of clamp diodes in series between the upper and the lower voltage rails. The clamp diodes connect at a node which is between a choke inductor and an output transformer of the bridge converter. In effect, Redl clamps the voltage across the output rectifier devices to the voltage at the junction of the resonant inductor and the power transformer. This effectively clamps the voltage across the primary winding of the transformer and, consequently, the secondary winding of transformer as well. This topology, however, produces a substantial forward current and substantial reverse recovery current in the clamping diodes. This results in substantial power dissipation in the diodes.

An improvement upon the system of Redl can be found with respect to U.S. Ser. No. 09/798,186, filed Mar. 1, 2001, entitled Passive Voltage Clamp for Rectifier Diodes in a Soft-Switching DC/DC Converter, naming Guerrera as an inventor, which is assigned to the assignee of the present invention, the disclosure of which is incorporated by reference. Guerrera clamps both the primary and the secondary voltages at the power transformer by providing an additional winding, referred to as a clamp winding, at the power transformer. While the system of Guerrera proves effective, the manufacture of such a system introduces several challenges. In particular, designing a transformer which can be suitably built to incorporate the Guerrera design proves to be a challenge. Because Guerrera calls for an extra clamp winding in proximity to the primary winding of the transformer, configuring the transformer to include this additional clamp winding can reduce the efficiency of the transformer.

Thus, it is desirable to provide a system which limits excessive voltage overshoot and severe ringing at the output rectifier diodes while maintaining a relatively efficient, manufacturable ZVS/ZVT bridge converter.

SUMMARY OF THE INVENTION

This invention is directed to a soft-switching DC/DC converter. The converter includes a positive voltage input terminal and a negative voltage input terminal interconnected by a semiconductor switching device. A transformer of the converter includes a primary and a secondary winding, and an output rectifier circuit is coupled to the secondary winding of the transformer. The converter includes an apparatus for clamping the voltage across the output rectifier circuit. The apparatus includes first and second clamp diodes connected in series across the positive and negative voltage input terminals. A resonant inductor is coupled in series with a primary winding of the transformer, and a voltage clamp circuit is connected across the resonant inductor. The voltage clamp circuit limits the voltage at the output rectifier circuit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
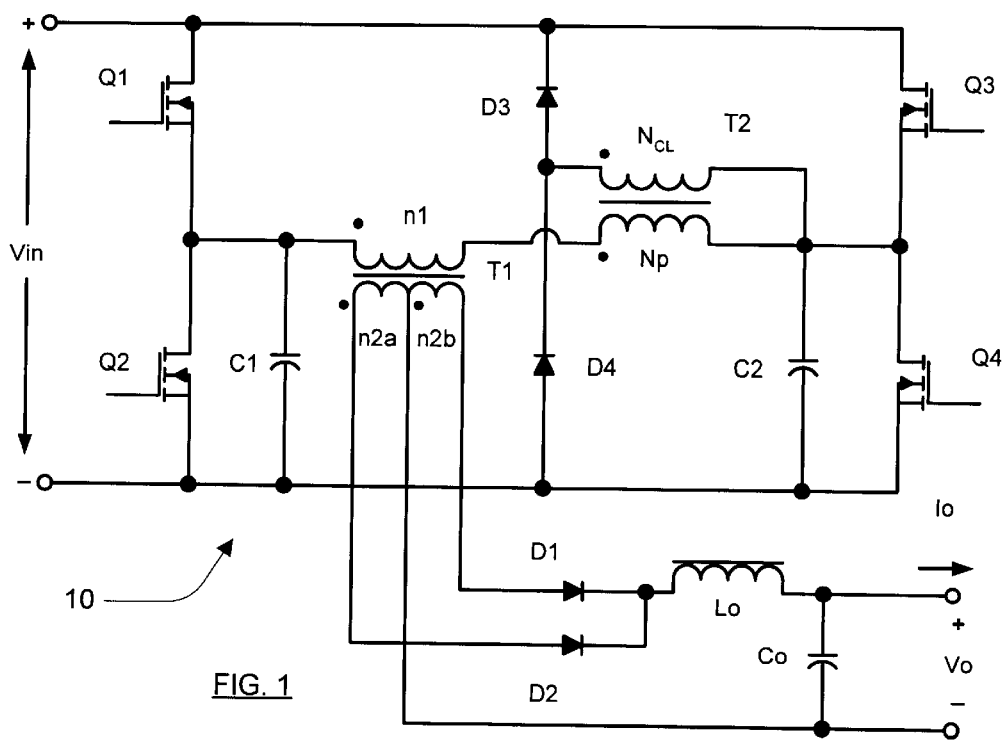
FIG. 1 is a circuit arranged in accordance with the principles of the present invention.

With reference to FIG. 1, FIG. 1 depicts a bridge converter 10 arranged with a resonant choke having a voltage clamp. Bridge converter 10 includes a pair of input terminals, a positive terminal and negative terminal, connected across an input power source Vin to define respective positive and negative voltage rails. A pair of switches Q1 and Q2 are connected in series between the positive and negative voltage rails. A second pair of switches Q3 and Q4 are also connected in series between the positive and negative voltage rails. A first capacitor C1 is connected in parallel across switch Q2, and a second capacitor C2 is connected in parallel across switch Q4. Converter 10 also includes a transformer T1 which includes a primary winding n1 and a secondary winding n2 having a pair of secondary windings n2a and n2b. It should be noted that capacitors C1 and C2 represent lumped up capacitances needed for ZVS action. This includes equivalent output capacitances of the MOSFETs as well as external capacitors if needed.

Primary winding n1 is connected in series with a resonant choke Np of transformer T2 between the positive terminals of capacitors C1 and C2. The secondary windings n2a and n2b connect to output rectifier diodes D1 and D2. Secondary windings n2a and n2b share a common terminal which defines a negative reference voltage terminal for the voltage output Vo. The other terminals of secondary windings n2a and n2b connect to the anodes of respective diodes D2 and D1. The rectifier diodes D1 and D2 are connected to output inductor Lo. An output capacitor Co is connected across the voltage output Vo terminals, with one terminal of output capacitor Co connected to a terminal of inductor Lo.

Also with reference to FIG. 1, an additional winding, clamp winding Ncl, is connected in parallel with resonant choke Np. Clamp winding Ncl clamps the voltage across resonant choke Np. If the number of turns of resonant choke Np and clamp winding Ncl are equal, the voltage across resonant choke Np is identical to the voltage across clamp winding Ncl. Further, by clamping the voltage at the resonant choke Ncl, the voltage at the primary winding n1 of transformer T1 and, consequently, the secondary winding n2 of transformer T2 is also clamped.

In operation, if the original number of turns of resonant choke Np is x turns, then the number of turns of voltage clamp Ncl is preferably selected to be equal to the number of turns of Np, or x turns. With the number of turns of resonant choke Np equal to the number of turns of the clamp winding Ncl, the voltage across resonant choke Np will be equal to the voltage across clamp winding Ncl. Assuming that the forward voltage drop of the diode D3 is Vd3 and the voltage drop of diode D4 is Vd4, then both the terminals of transformer T2 indicated by dots will be clamped during the positive excursion of the voltage to Vin+Vd3 and will be clamped during the negative excursion to the voltage−Vd4. If the diode drops are neglected, then the interconnection between the transformer T1 and the resonant choke Np will be clamped to Vin during the positive excursion of the voltage and to GND during the negative excursion of the voltage. As a result, the voltage across primary winding n1 of power transformer T1 will be clamped to an absolute value of Vin and consequently clamp the voltage across secondary winding n2 in accordance with the relative number of turns between primary winding n1 and secondary winding n2.

Figure 2:
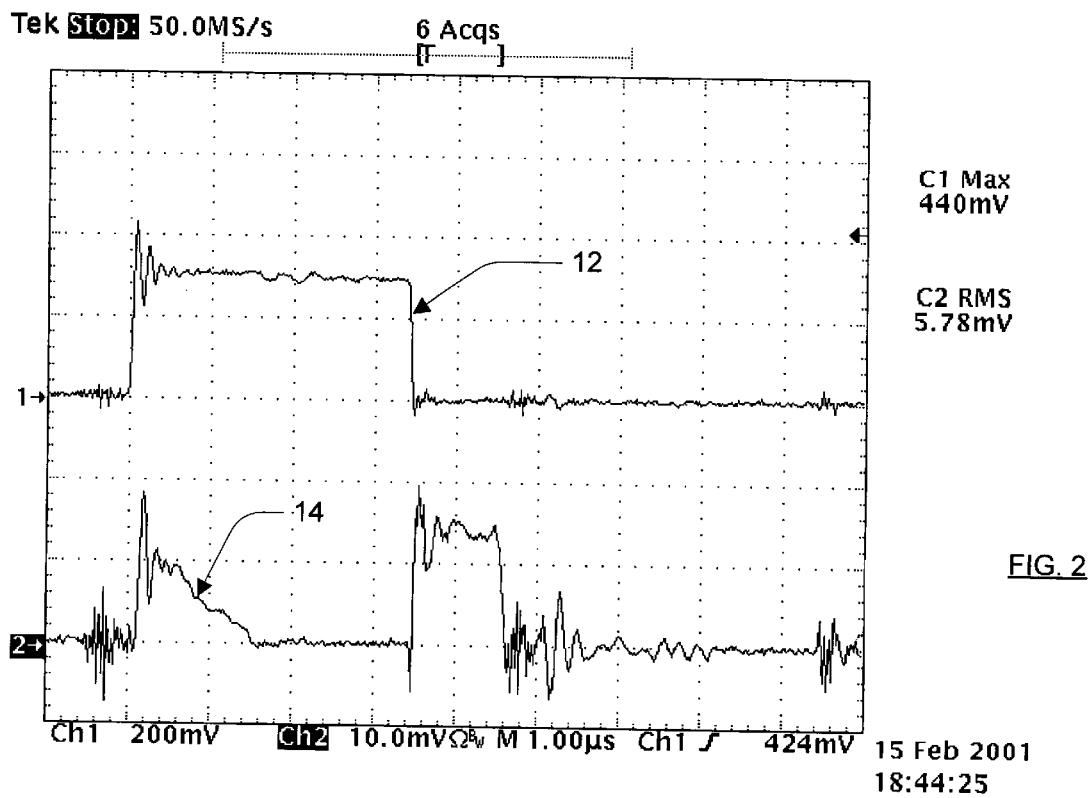
FIG. 2 is a graph showing a waveform depicting the operation of the circuit of FIG. 1.

FIG. 2 depicts a pair of waveforms which demonstrated the operation of the circuit of FIG. 1. In particular, a first waveform 12 represents a reverse voltage at the output rectifier when utilizing clamp winding Ncl on resonant choke Np. A second waveform 14, represents the current through rectifier diode D1 when utilizing clamp winding Ncl on resonant choke Np. For FIG. 2, clamp winding Ncl and resonant choke Np have equal number of terms. The peak reverse voltage is approximately 220V while a conventional, prior art, phase shifted bridge has a peak reverse voltage of approximately 296V. The peak reverse voltage is approximately 5.8% higher than a similar circuit with the teachings of Redl. The root-mean-square (RMS) current through the upper clamp diode and D1 is approximately 1.156A RMS. By comparison with the circuit of Redl, the RMS current is approximately 15% lower. Further, the reverse recovery time of the clamp diode is significant because this is proportional to the switching loss. The leakage inductance of the clamp winding with respect to the resonant winding accounts for the slight increase in output rectifier peak reverse voltage of the present invention over Redl. However, the leakage inductance reduces the RMS current through clamp diodes D3 and D4 and lowers and the reverse current through the clamp diodes. One further advantage of the circuit of the present invention is flexibility because the clamping voltage on secondary winding n2 may be higher than what the turn ratio of the power transformer T1 allows. This occurs by selecting the turn ratio Ncl/Np<1. Further, the present invention offers a significant reduction in the severe high frequency ringing present in conventional phase shifted ZVS/ZVT converters resulting in a consequent reduction and electromagnetic interference.

The present invention also offers several additional advantages. First, it is typically difficult to incorporate extra windings in the power transformer, especially for transformers utilizing sandwich winding techniques, were two half-primary windings sandwich the secondary. Placing a clamp winding on the resonant choke typically alleviates this consideration. Second, if the transformer construction does not enable a transition to a bigger transformer, incorporating a clamp winding in the transformer can decrease the copper area of the windings, which will consequently decreased efficiency. Placing a clamp winding in the resonant choke alleviates this consideration. Thirds, when a clamp winding is placed in a power transformer, the leakage inductance between the primary winding and the secondary winding increases because of the increased separation between the primary and the secondary windings to accommodate the clamp winding. This requires a larger resonant choke for proper ZVS/ZVT switching. However, placing a clamp winding in the resonant choke will not increase leakage inductance of the power transformer. Fourth, for applications having more than one power transformer, only one clamp winding needs to be added to the circuit of FIG. 1, whereas if the clamp winding is included with the transformer, two clamp windings will be required. Fifth, the number of turns in the power transformer is normally much higher than the number of turns in the resonant choke. Thus, more turns would be required if the clamp winding is placed in the transformer, rather than if placed in the resonant choke. Sixth, placing a clamp winding in the transformer will require attention to various safety considerations which are alleviated if the clamp winding is placed in the resonant choke. Seventh, placing a clamp winding in the resonant choke allows for ease of adjustment, while placing the clamp winding in the transformer significantly complicates optimizing the circuit.

Figure 3:
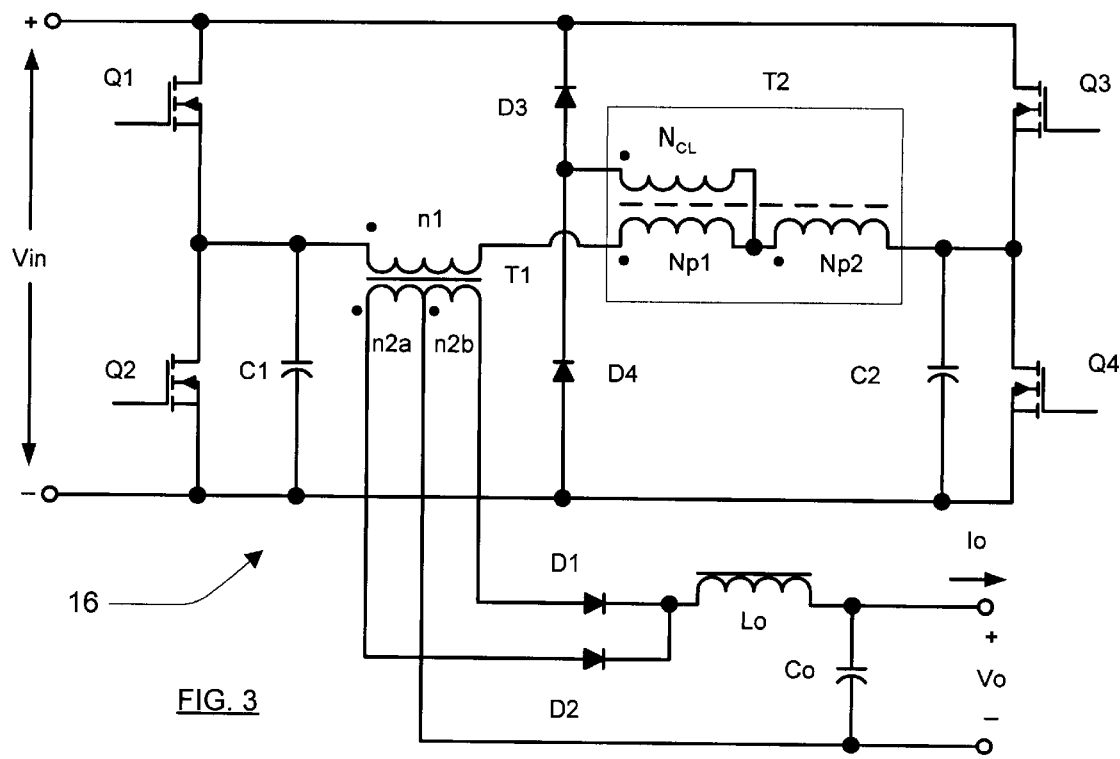
FIG. 3 is alternative arrangement to the circuit of FIG. 1, showing a choke inductor tapped intermediate to its terminals by the clamp inductor.

FIG. 3 depicts a circuit 16 including a voltage clamp in which the clamp winding is tapped anywhere within resonant choke Np. It should be noted from the outset that like reference numerals from the previous figures will be used to describe similar components in FIGS. 3 through 7. In FIG. 3, all the components are similarly arranged in as in FIG. 1. FIG. 3 differs from FIG. 1 in that the transformer T2 includes a clamp winding Ncl that is tapped anywhere within resonant choke Np. Resonant choke Np is comprised of two inductors Np1 and Np2, where the number of turns of resonant choke Np is equal to the number of turns of Np1 added to the number of turns of Np2. Preferably, the number of turns of the clamp winding Ncl is selected to be equal to the number of turns of winding Np1.

Figure 4:
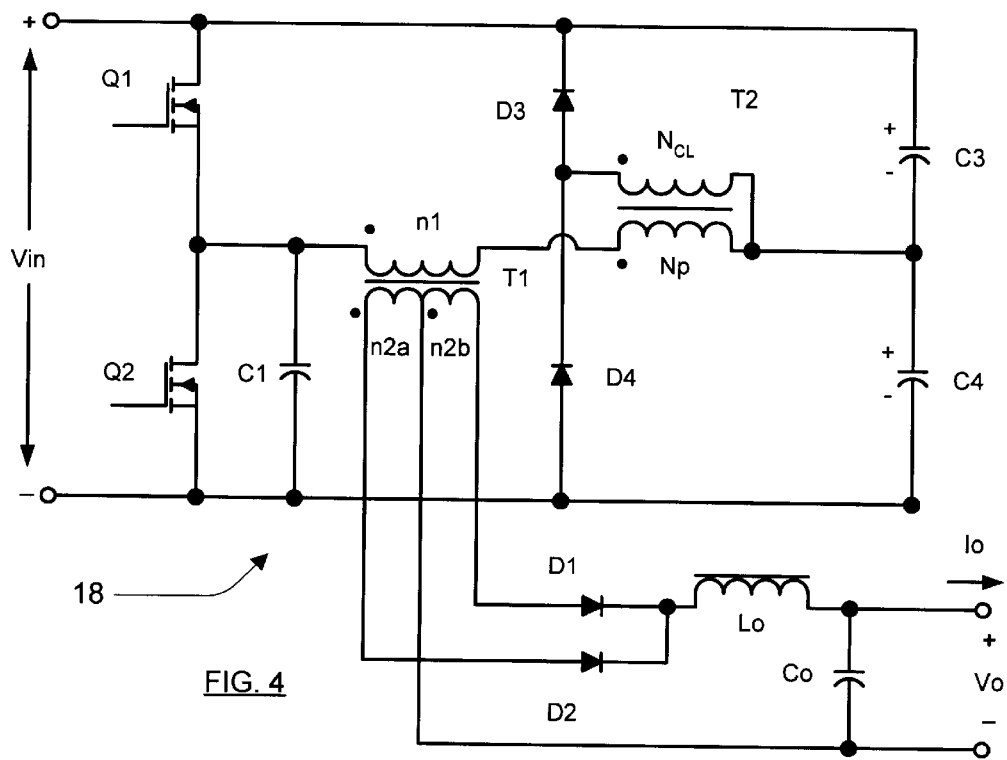
FIG. 4 is a circuit arranged in accordance with the principles of the present invention utilizing a half-bridge topology.
Figure 5:
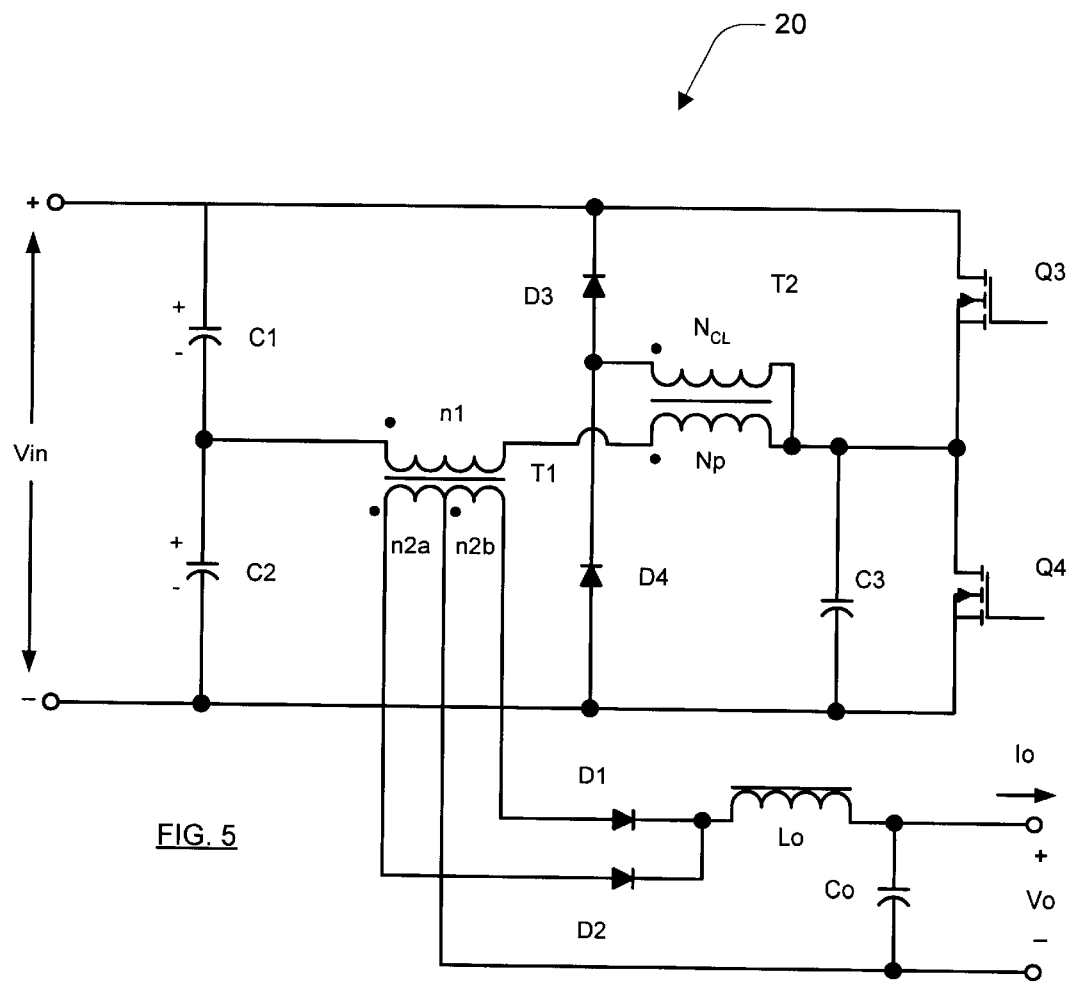
FIG. 5 is a circuit arranged in accordance with the principles of the present invention utilizing an alternative half-bridge topology.

With reference to FIG. 4, FIG. 4 depicts a circuit 18 including a voltage clamp in which the voltage clamp is implemented in a half-bridge topology. In particular, switches Q3 and Q4 have been replaced by capacitors C3 and C4. In such an arrangement, capacitor C2 of FIG. 1 is replaced by capacitor C4. FIG. 5 depicts a circuit 20 similar to FIG. 4 except that switches Q3 and Q4 remain, while switches Q1 and Q2 have been replaced by capacitors C1 and C2. In FIG. 5, capacitor C1 of FIG. 1 has replaced by capacitor C3.

Figure 6:
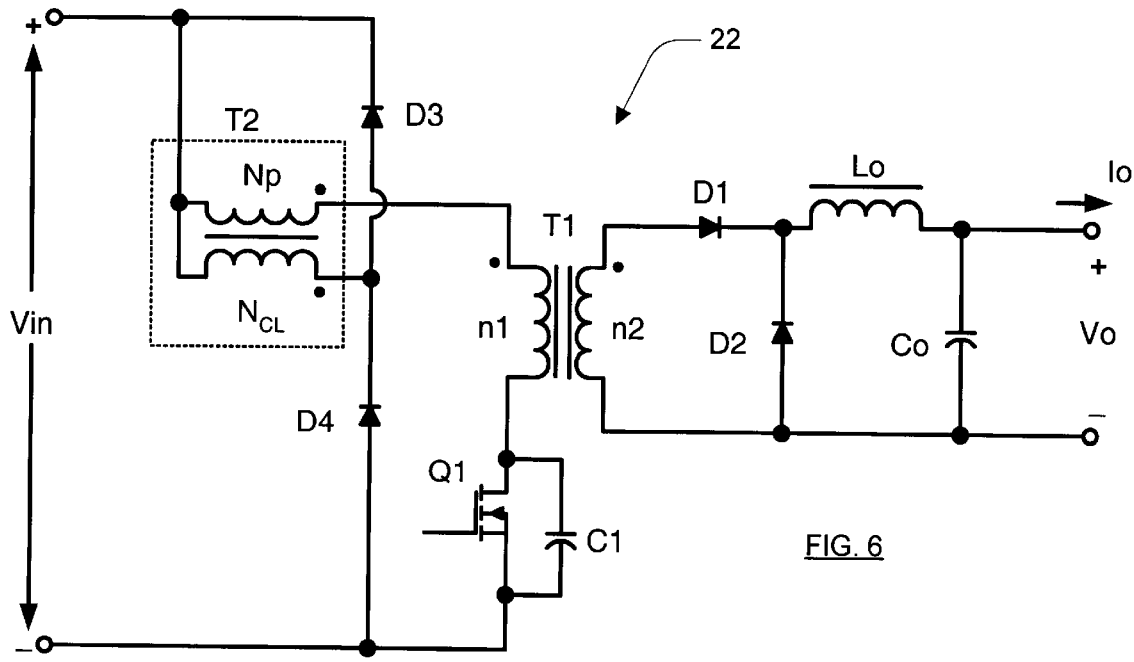
FIG. 6 is a circuit arranged in accordance with the principles of the present invention utilizing a forward converter topology.

With reference to FIG. 6, FIG. 6 depicts an alternative arrangement for utilizing a clamp winding in which the clamp winding is placed on a resonant choke in a forward converter 22. Forward converter 22 includes a switch Q1 in parallel with capacitor C1. Switch Q1 is placed in series between the negative rail of forward converter 22 and a first terminal of primary winding ni of transformer T1. A second terminal of primary winding N1 is connected to a first terminal of resonant choke Np. The second terminal of resonant choke Np is connected to the positive rail to trail of forward converter 22. A clamp winding Ncl has a first terminal connected to the second terminal of resonant choke Np. As described above, clamping diodes D3 and D4 are arranged in series between the positive and negative voltage rails of converter 22. A second terminal of clamp winding Ncl is connected to the interconnection between diodes D3 and D4. Transformer T1 also includes a secondary winding n2 which has a pair of output terminals. Each output terminal connects to a positive terminal of a respective rectifier diode D1 and D2. The negative terminals of rectifier diodes and D1 and D2 connect to output inductor Lo. An output capacitor Co is connected across the voltage output Vo terminals, and has one terminal connected to output inductor Lo. In operation, clamp winding Ncl operates as described above with respect to FIGS. 1–5 by clamping the voltage across resonant choke Np.

Figure 7:
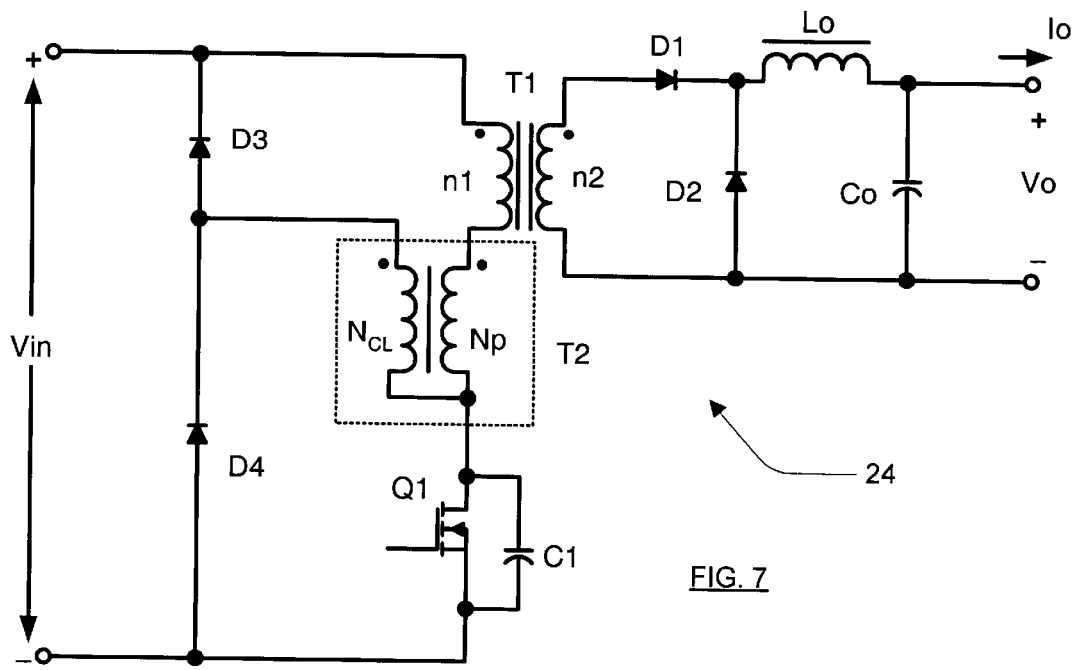
FIG. 7 is a circuit arranged in accordance with the principles of the present invention utilizing an alternative forward converter topology.

FIG. 7 depicts the voltage clamp winding of the present invention utilized in a forward converter 24, but connected to the opposite leg of primary winding N1 of transformer T1. Clamp winding Ncl is similarly connected between the interconnection of clamping diodes D3 and D4 and a leg of resonant choke Np. In the embodiment of FIG. 7, resonant choke Np is placed in series between switch Q1 and a leg of primary winding n1 of transformer T1. The other leg of primary winding n1 connects to the positive voltage rail of forward converter 24.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a soft-switching DC/DC converter including a positive voltage input terminal and a negative voltage input terminal interconnected by a semiconductor switching device, a transformer, and an output rectifier circuit coupled to a secondary winding of the transformer, an apparatus for clamping the voltage across the output rectifier circuit comprising:
   first and second clamp diodes connected in series across the positive and negative voltage input terminals;
   a resonant inductor coupled in series with a primary winding of the transformer; and
   a voltage clamp circuit, the voltage clamp circuit including an inductor mutually coupled with the resonant inductor, the inductor having a first terminal connected to one of an end or an intermediate tap of the resonant inductor and having a second terminal connected to a common node of the first and second clamp diodes, the voltage clamp circuit limiting the voltage at the output rectifier circuit.

2. The apparatus of claim 1 wherein the inductor of the voltage clamp circuit includes a number of windings equal to a number of windings of the resonant inductor.

3. The apparatus of claim 1 wherein the output rectifier circuit comprises at least one of the group of diodes and synchronous rectifiers.

4. The apparatus of claim 1 wherein the converter is a phase shifted bridge converter, the bridge converter comprising a plurality of switches connected in series between the positive and the negative voltage input terminals, wherein the plurality of switches are interconnected at a node, and the transformer includes a primary winding and a secondary winding, wherein a first terminal of the primary winding connects to the node and the secondary winding connects to the output rectifier circuit and wherein a second terminal of the primary winding connects to the resonant inductor.

5. The apparatus of claim 4 wherein the bridge converter is one of a full-bridge converter and a half-bridge converter.

6. The apparatus of claim 1 wherein the converter is a forward converter, the forward converter comprising a switch connected in series with the a primary winding of the transformer between the positive and the negative voltage input terminals, wherein the clamp diodes interconnect at a node, and the voltage clamp circuit includes a terminal connected to the node, and the transformer includes a primary winding and a secondary winding, wherein a first terminal of the primary winding connects to resonant inductor, and the secondary winding connects to the output rectifier circuit.

7. The apparatus of claim 6 wherein a second terminal of the primary winding connects to the positive voltage input terminal.

8. The apparatus of claim 6 wherein a second terminal of the primary winding selectively connects to the negative rail via the semiconductor switch.

9. A soft-switching DC/DC converter comprising:
   a positive input terminal and a negative voltage input terminal;
   a semiconductor switching device interconnecting the positive and negative voltage input terminals;
   a transformer having a primary winding and a secondary winding;
   an output rectifier circuit coupled to the secondary winding of the transformer;
   first and second clamp diodes connected in series across the positive and negative voltage input terminals;
   a resonant inductor coupled in series with the primary winding of the transformer; and
   a voltage clamp circuit, the voltage clamp circuit including an inductor mutually coupled with the resonant inductor, the inductor having a first terminal connected to one of an end or an intermediate tap of the resonant inductor and having a second terminal connected to a common node of the first and second clamp diodes the voltage clamp circuit limiting the voltage at the output rectifier circuit.

10. The apparatus of claim 9 wherein the voltage clamp includes a number of windings equal to a number of winding of the resonant inductor.

11. The apparatus of claim 9 wherein the output rectifier circuit comprises at least one of the group of diodes and synchronous rectifiers.

12. The apparatus of claim 9 wherein the converter is a phase shifted bridge converter, the bridge converter comprising a plurality of switches connected in series between the positive and the negative voltage input terminals, wherein the plurality of switches are interconnected at a node, wherein a first terminal of the primary winding connects to the node and the secondary winding connects to the output rectifier circuit and wherein a second terminal of the primary winding connects to the resonant inductor.

13. The apparatus of claim 12 wherein the bridge converter is one of a full-bridge converter and a half-bridge converter.

14. The apparatus of claim 9 wherein the converter is a forward converter, the forward converter comprising a switch connected in series with the a primary winding of the transformer between the positive and the negative voltage input terminals, wherein the clamp diodes interconnect at a node, and the voltage clamp circuit includes a terminal connected to the node, wherein a first terminal of the primary winding connects to resonant inductor, and the secondary winding connects to the output rectifier circuit.

15. The apparatus of claim 14 wherein a second terminal of the primary winding connects to the positive voltage input terminal.

16. The apparatus of claim 14 wherein a second terminal of the primary winding selectively connects to the negative rail via the semiconductor switch.

* * * * *